March 11, 1958  O. E. KRUSE  2,826,628
EDUCATIONAL APPARATUS
Filed Jan. 26, 1954  2 Sheets-Sheet 1

Olan E. Kruse
INVENTOR.

March 11, 1958
O. E. KRUSE
2,826,628
EDUCATIONAL APPARATUS
Filed Jan. 26, 1954
2 Sheets-Sheet 2
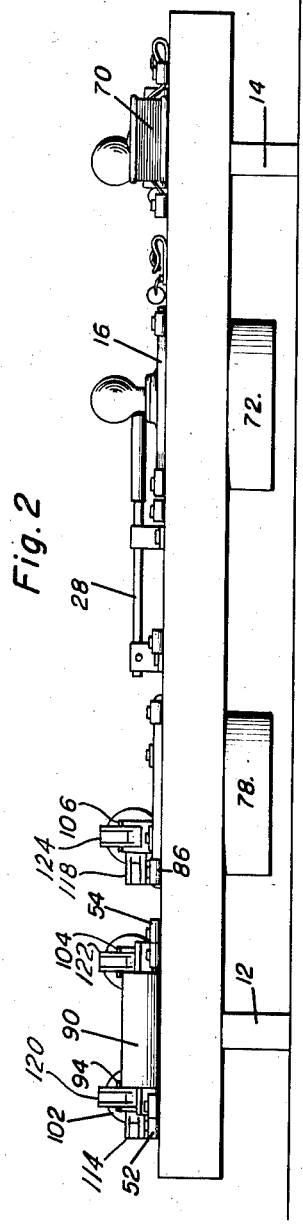
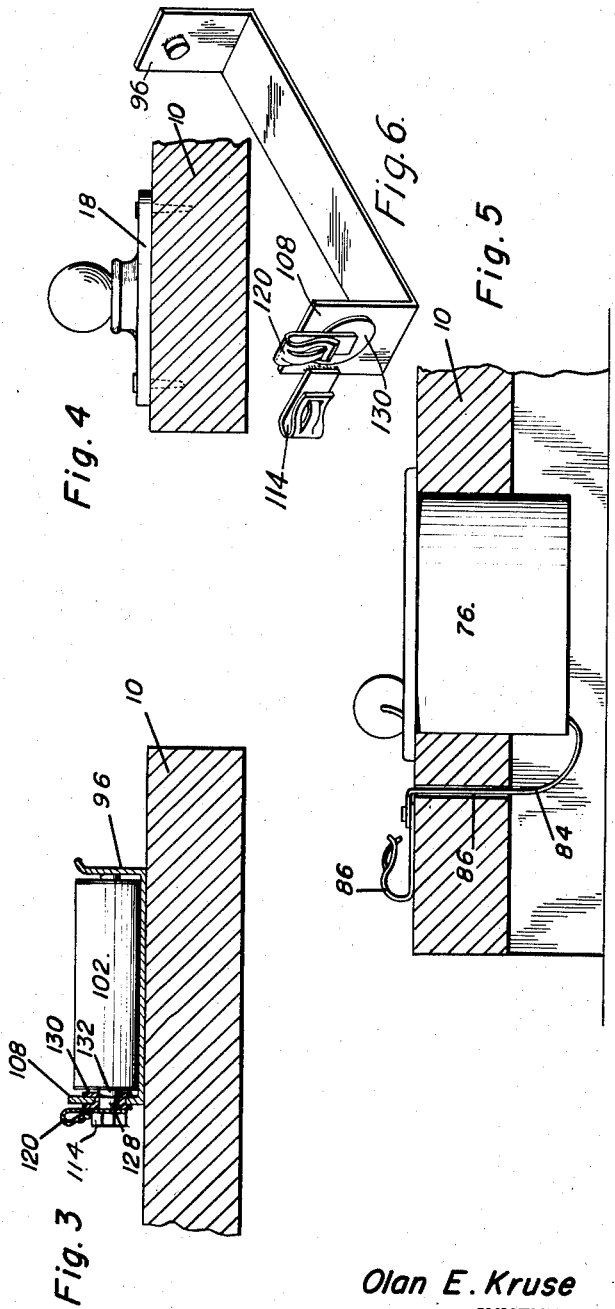
Olan E. Kruse
INVENTOR.
BY
Attorneys

United States Patent Office 2,826,628
Patented Mar. 11, 1958

2,826,628
EDUCATIONAL APPARATUS
Olan E. Kruse, Nacogdoches, Tex.

Application January 26, 1954, Serial No. 406,161

1 Claim. (Cl. 136—173)

This invention relates to educational apparatus and more particularly to a novel electrical experiment board.

The primary object of this invention resides in the provision of an electrical experiment board adapted to enable various experiments to be performed thereon so as to demonstrate various phenomena of current electricity, this being accomplished with a small number of parts, all mounted; the small number of parts permitting a large number and variety of experiments due to a judicious choice of parts which allows a multiplicity of uses for most of the parts.

Another object of the invention is to provide an electrical mounting board which employs means for enabling satisfactory connections between the various components of the board to be quickly established and which allows for rapid disconnection.

Incorporated in the invention is a plurality of battery supports which are adapted to support dry cell batteries in such manner that a selected amount of electrical power can be consumed in the conducting of a suitable experiment depending upon the type of connections used to the batteries.

Still further objects and features of this invention reside in the provision of an electrical experiment board that is strong and durable, simple in construction and manufacture, capable of being used in conjunction with suitable connecting wires so that the various electrical circuits and other phenomena can be carefully and accurately studied, and which is comparatively inexpensive to produce, thereby permitting wide distribution to institutions of learning.

These, together with the various ancillary objects and features of the invention which will become apparent as the following description proceeds, are attained by this educational apparatus, a preferred embodiment of which has been illustrated in the accompanying drawings, by way of example only wherein:

Figure 2 is a side elevational view of the educational apparatus;

Figure 3 is a vertical sectional view as taken along the plane of line 3—3 in Figure 1;

Figure 4 is a vertical sectional view as taken along the plane of line 4—4 in Figure 1;

Figure 5 is a vertical sectional view as taken along the plane of line 5—5 in Figure 1 illustrating the connections to one of the indicating instruments as utilized in the present invention; and, Figure 6 is a perspective view of a battery holder forming an important unit of the invention.

Figure 1:
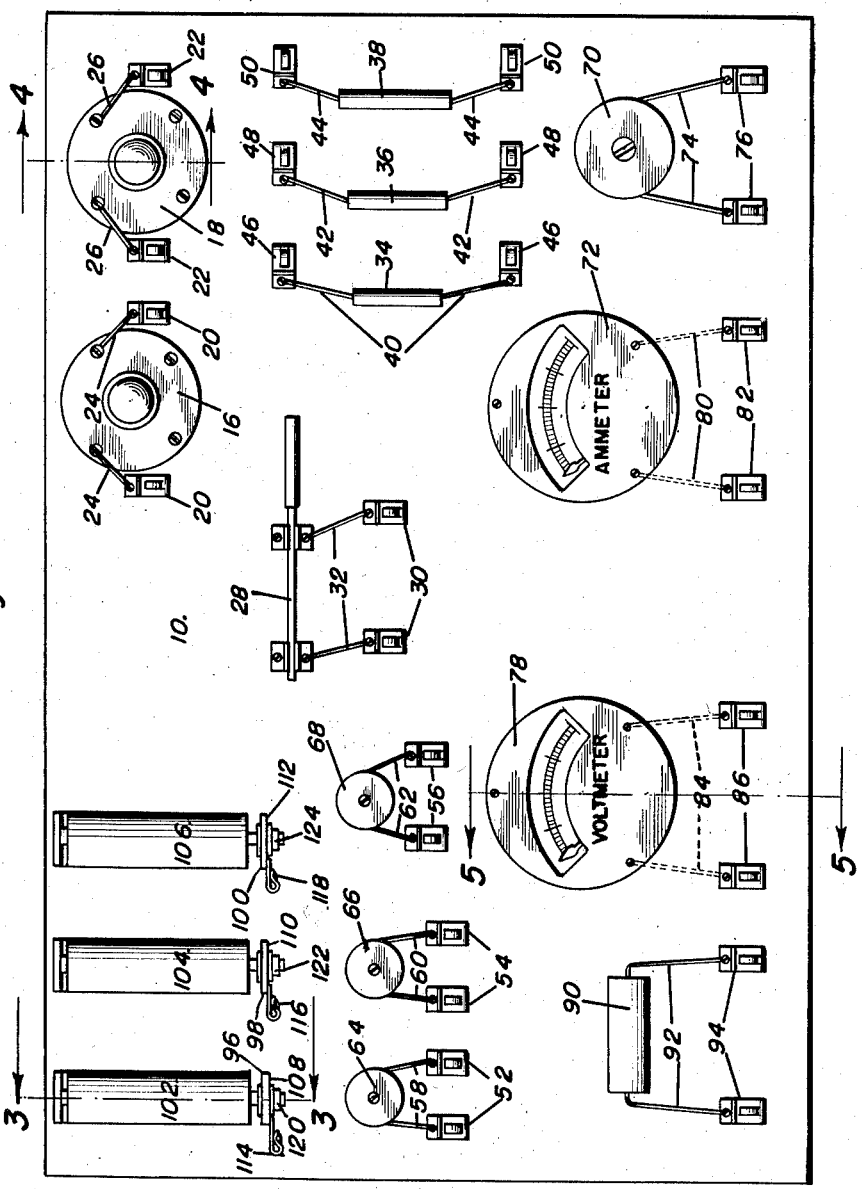
Figure 1 is a plan view of the electrical experiment board comprising the present invention.

With continuing reference to the accompanying drawings wherein like reference numerals designate similar parts throughout the various views, reference numeral 10 generally designates the experiment board comprising the present invention which is preferably formed of a suitable material such as plywood or the like and is preferably rectangular in shape. The board 10 is adapted to be supported by a pair of spaced runners or legs 12 and 14 attached to and depending from the board 10.

Mounted on the board 10 are various electrical components which include a pair of lamp sockets 16 and 18. Pairs of clips 20 and 22 are attached and electrically connected to the lamp sockets 16 and 18 by means of pairs of conductors 24 and 26. A switch 28 is also mounted on the board 10 and has a pair of clips 30 electrically connected thereto as by conductors 32, the clips 30 being adapted for rapid connection with suitable electrical conductors. Three resistors 34, 36 and 38 are mounted on the board and connected by suitable conductors 40, 42 and 44 to pairs of clips 46, 48 and 50. The resistors 34, 36 and 38 are chosen to be of suitable values for facilitating experiments on the board 10 and it is noted that values approximating 10 ohms for resistor 34, 15 ohms for resistor 36 and 20 ohms for resistor 38 have been found to be satisfactory.

Pairs of clips 52, 54 and 56 are connected by conductors 58, 60 and 62 to wound wire resistors 64, 66 and 68. The resistors 64 and 66 may be each formed from a spool of twenty feet of No. 36 copper wire while the resistor 68 may be formed from a spool of forty feet of No. 30 copper wire. The resistor 70 is also a wound wire resistor and is of a value equivalent, at ordinary room temperatures, to the internal resistance of the ammeter 72 mounted on the board 10. The resistor 70 is provided with a pair of conductors 74 for connection to the clips 76 mounted on the board 10.

The ammeter 72 extends through a suitable circular aperture in the base 10 and as with the volt meter 78, the conductors 80 thereof extend through suitable apertures adjacent the clips 82 so that the conductors 80 are almost completely positioned beneath the board 10. The construction of the mounting of the volt meter 78 can be best seen in Figure 5 and it will be noted that herein the conductors 84 extend through apertures 86 formed in the base 10 and are connected to the clips 86.

The resistor 70 is connected by conductors 74 to the clips 76 and it is noted that the resistor 70 is equal to the resistance of the ammeter within a percent difference less than the maximum error percentage of the meter as specified by the meter manufacturer. The purpose of resistor 70 being to double the range of the ammeter when connected in parallel with same.

A further resistor 90 is connected by conductors 92 to the clips 94 and it is noted that the resistor 90 is equal to the resistance of the voltmeter within a percent difference less than the maximum error percentage of the meter as specified by the meter manufacturer. The purpose of the resistor 90 being to double the range of the voltmeter when connected in series with same.

A plurality of suitable battery supports 96, 98 and 100 are mounted on the board 10 for holding batteries 102, 104 and 106, any suitable number of battery holders can of course be utilized. Battery holders 96, 98 and 100 are substantially U-shaped and are provided with contact members 108, 110 and 112, respectively. Horizontally extending clips 114, 116 and 118 are mounted in a different manner which can be best seen in Figure 3. It will be noted that in Figure 3 the battery holder 96 is illustrated and the contact member 108 is likewise shown in detail. However, the contact members 110 and 112 are identical with the contact member 108. The contact member 108 is provided with an aperture therethrough and a plug 128 of conductive material is mounted in the aperture. The vertically extending clip 120 is electrically connected to the plug 128. A rib 130 of insulative material surrounds the plug 128 and supports the plug 128 in the contact member 108 and thus insulates the plug 128 from the contact member 108. It is to be noted that the terminal 132 of the battery 102 is adapted to engage the plug 128 while the rest of the battery holder 96 is electrically connected to the clip 114 and is in electrical contact with the case of the battery 102.

The use of the clips mounted on the single contact member of the battery holders enables both series and parallel connections to be made to the batteries 102, 104 and 106 without the tangling or criss-crossing of wires. Further, a saving on the wires may be had since all of the clips for the batteries are closer together.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

In an educational apparatus for conducting experiments in electricity, a plurality of spaced battery holders, said battery holders being substantially U-shape and having pairs of upwardly extending electrically conductive contact members, one of each of said pairs of contact members having an aperture therethrough, a horizontally extending clip secured to and electrically connected to each of said one of each of said pairs of contact members, a conductive plug in alignment with and extending through each aperture, a rib of insulation material about each of said plugs and insulating each of said plugs from each of said one of each of said pairs of contact members while securing each of said plugs to each of said one of each of said pairs of contact members, and vertically extending clips secured to and electrically connected to each of said plugs.

References Cited in the file of this patent

UNITED STATES PATENTS

| | | |
|---|---|---|
| 1,271,641 | Werwath | July 9, 1918 |
| 1,879,623 | Jones | Sept. 27, 1932 |
| 1,968,039 | Hornberger | July 31, 1934 |
| 2,374,800 | Bohlke | May 1, 1945 |
| 2,449,550 | Eichberg et al. | Sept. 21, 1948 |
| 2,449,568 | Shriro et al. | Sept. 21, 1948 |

FOREIGN PATENTS

| | | |
|---|---|---|
| 344,668 | Great Britain | Mar. 12, 1931 |
| 531,455 | Great Britain | Jan. 3, 1941 |